United States Patent Office 3,358,929
Patented Dec. 19, 1967

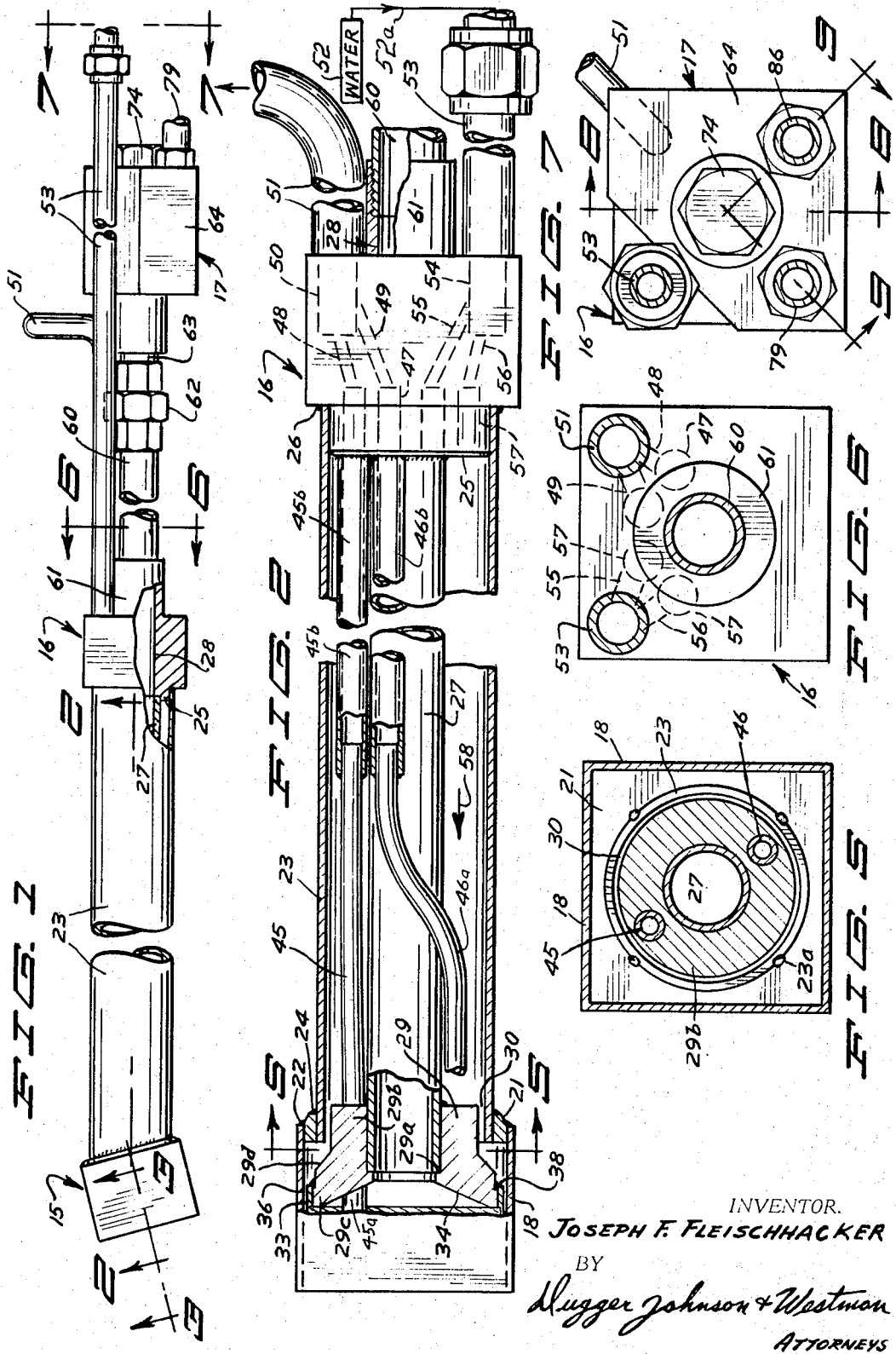

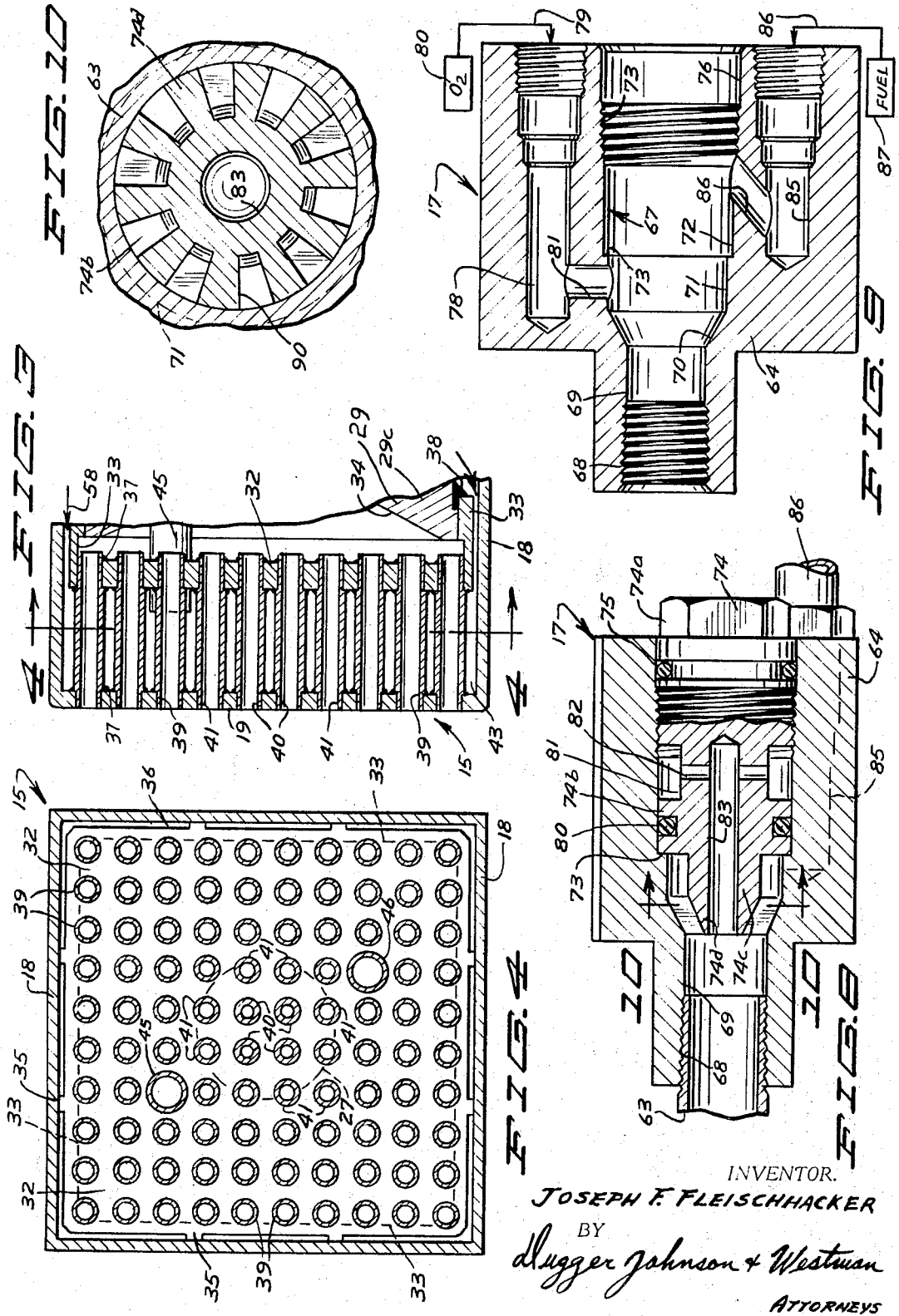

3,358,929
WATER COOLED TORCH INCLUDING AN
OXYGEN-GAS MIXER ASSEMBLY
Joseph F. Fleischhacker, Wayzata, Minn., assignor to Tescom Corporation, Minneapolis, Minn., a corporation of Minnesota
Filed Oct. 7, 1965, Ser. No. 493,813
16 Claims. (Cl. 239—132.3)

ABSTRACT OF THE DISCLOSURE

A water cooled torch having a plurality of spaced preheat tubes opening at their one ends to the atmosphere and their opposite ends to a mixed gas plenum chamber. A water chamber surrounds the preheat tubes and the mixed gas plenum chamber to circulate cooling water around the aforementioned tubes, the plenum chamber and the mixed gas tube that supplies gas to the plenum chamber. A mixer assembly is fluidly connected to the mixed gas tube and has a slotted frusto-conical portion for conducting oxygen from an annular clearance space to a mixing chamber to be mixed with the fuel gas.

---

This invention relates to new and novel improvements in water cooled torches. More particularly, this invention relates to a new and novel water cooled torch having a relatively large number of spaced gas outlet orifices adjacent which the gas is ignited, that is water cooled in order to permit high temperature heating without breakdown over relatively prolonged periods, and that is relatively easy to repair.

One of the objects of this invention is to provide a new and novel water cooled heating torch. Another object of this invention is to provide a heating torch that will produce flame temperatures up to 6,000° F. and maintain a maximum heat output over relatively long periods without breakdown. A further object of this invention is to provide in a heating torch, new and novel cooling apparatus for circulating water past all surfaces exposed to the heat.

An additional object of this invention is to provide a readily repairable water cooled torch head assembly. Another object of this invention is to provide new and novel mixer assembly in a heating torch.

Other and further objects are those inherent in the invention herein illustrated, described and claimed, and will become apparent as the description proceeds.

To the accomplishment of the foregoing related ends, this invention then comprises the features hereinafter fully disclosed and particularly pointed out in the claims, the following description setting forth in detail certain illustrative embodiments of the invention, these being indicative, however, of but a few of the various ways in which the principles of the invention may be employed. The invention is illustrated by reference to the drawings in which corresponding numerals refer to the same parts, and in which;

FIGURE 1 is a plan view of the torch of this invention, axial portions of the torch being broken away and a portion being shown in cross section;

FIGURE 2 is a somewhat enlarged side elevational view of a portion of the torch shown in FIGURE 1, portions of this view shown in longitudinal cross-section being generally taken along the line and in the direction of the arrows 2—2 of FIGURE 1;

FIGURE 3 is a fragmentary enlarged longitudinal cross-sectional view of the torch head assembly, said view being generally taken along the line and in the direction of the arrows 3—3 of FIGURE 1;

FIGURE 4 is a transverse cross-sectional view generally taken along the line and in the direction of the arrows 4—4 of FIGURE 3 to more clearly show the water passageways and preheat tube arrangement;

FIGURE 5 is a transverse cross-sectional view generally taken along the line and in the direction of the arrows 5—5 of FIGURE 2 to show the connection of the barrel to the head housing;

FIGURE 6 is a transverse cross-sectional view generally taken along the line and in the direction of the arrow 6—6 of FIGURE 1 to further illustrate the construction of the water manifold;

FIGURE 7 is an enlarged end view of the mixer body, said view being generally taken along the line and in the direction of the arrows 7—7 of FIGURE 1;

FIGURE 8 is an enlarged longitudinal cross-sectional view of the mixer assembly, said view being generally taken along the line and in the direction of the arrows 8—8 of FIGURE 7;

FIGURE 9 is a further enlarged longitudinal cross-sectional view of the mixer body, said view being generally taken along the line and in the direction of the arrows 9—9 of FIGURE 7 to more fully show the fluid channels in the mixer body; and FIGURE 10 is a fragmentary transverse cross-sectional view generally taken along the line and in the direction of the arrows 10—10 of FIGURE 8 of the mixer and adjacent portions of the mixer body.

Referring now in particular to FIGURE 1, the torch of this invention includes a head assembly, a water manifold, and a mixer assembly which are respectively generally designated 15, 16 and 17. The head assembly includes a housing having a front wall 19 and four side walls 18 that are joined together at contiguous edges to provide an enclosure having a rectangular opening opposite the front wall. The back peripheral edges of the side walls are silver soldered at 22 to an adapter 21 that is generally rectangular in transverse cross-section. The adapter has a central aperture into which the forward end of the water barrel 23 is extended, the water barrel first having four front edge portions spot brazed at 23a to adjacent front surface portions of the adapter and then being silver soldered at 24 to the adjacent back surface of the adapter. The opposite end of the barrel surrounds a diametric portion of 25 of the water manifold 16 and is silver soldered to the manifold at 26.

The manifold has a central axial bore 28 therethrough, one end of central tube 27 being silver soldered to portion 25 to open to bore 28. Each of the aforementioned "silver soldered" joints form fluid tight connections between the respective members. Tube 27 extends forwardly through the water barrel in concentric relation thereto, the outside diameter of tube 27 being substantially smaller then the inside diameter of barrel 23 to provide an annular clearance space. The forward end of tube 27 extends into a central aperture formed in the head 29 to seat against a shoulder 29a. The back surface of head 29 is brazed to the adjacent portion of tube 27 to form a fluid seal therewith.

The head has a rear annular portion 29b that is concentric to barrel 23 and that extends axially forwardly thereof, the outside diameter of portion 29b being somewhat smaller than the inside diameter of barrel 23 to provide an annular clearance space 30. The head also has a forward end portion 29c that in transverse cross-section has a rectangular perimetric edge. Portion 29c is integrally joined to portion 29b by a tapered portion 29d that diverges outwardly in a forward direction.

Axially intermediate the front wall 19 and head 29 there is provided a preheat member having a rectangular plate 32, integrally joined to four sidewalls 33 which extend axially rearwardly of said plate 32 to have their rearward end portions overlap head portion 29c. The rearward edges of walls 33 are brazed at 38 to portion 29c as shown in FIGURE 2 to form a fluid tight connection therebetween. Plate 32, walls 33 and head portion 29c cooperatively provide a plenum chamber 34, portion 29c having a frusto-conical recess with a minor base opening in fluid communication with the interior of tube 27 and a major base opening that opens to a space rectangular in cross section that is bounded by walls 33 and axially between plate 32 and portion 29c. Around the peripheral edge of plate 32 and walls 33, there are provided axially elongated, transversely outwardly extending integral lands 35 to abut against adjacent inner surface portions of housing walls 18. Due to the provisions of lands 35, which are of a relatively small dimension in a direction parallel to the adjacent wall 18, there is provided fluid passages 36 which permit fluid flow from clearance space 30 to a location axially intermediate plate 32 and front wall 19 including along the inner surface of the front wall.

A plurality of axially extending, transversely spaced, short preheat tubes 39, 40 and 41 have their rearward end portions extended through appropriate apertures in plate 32 to open to plenum chamber 34 and their forward end portions extended through appropriate apertures in front wall 19 to open to the ambivalent atmosphere. Preferably, the tubes have reduced diameter opposite end portions to provide shoulders that abut against the front wall and plate 32 respectively, the adjacent outer surface portions of the tubes being silver soldered at 37 to said front wall and plate 32 to prevent fluid leakage through the apertures into which said tubes are extended. The tubes 40 that are directly axially forwardly of the opening through pipe 27 into the plenum chamber have the smallest inside diameters while the tubes 41 that are next most adjacent tubes 40 each have an intermediate size inside diameter and the remaining tubes 39 each have a maximum inside diameter. For the particular embodiment of the invention illustrated, there are four preheat tubes 40, twelve tubes 41, and eighty-two tubes 39; there being in each row that includes a tube 40, a tube 41 intermediate a tube 40 and a tube 39. By providing this type of arrangement of preheat tubes of various inside diameters, a better distribution of flow of fluid from the plenum chamber through the preheat tubes to the outlet orfices of the preheat tubes takes place. Also to be noted, is that there is a fluid clearance space between each of the preheat tubes and between each outer row of preheat tubes and the adjacent sidewall 18.

For purposes of further describing the invention, the space axially between adjacent surfaces of front wall 19 and plate 32 that is bounded by sidewalls 18 and exterior of the tubes 39–41 will hereinafter be referred to as water chamber 43. A pair of water outlet tubes 45 and 46 open into water chamber 43 substantially forwardly of plate 32. Tubes 45 and 46 thence extend rearwardly through appropriate apertures in plate 32, thence rearwardly through plenum chamber 34 and then through appropiate apetures in head 29. The adjacent surfaces of tubes 45, 46 are silver soldered to the front surface of plate 32 and the back surface of head 29 to prevent fluid leakage through the apertures that the tubes are extended. As may be noted, from FIGURE 5, the tubes 45, 46 are located on diametrically opposite sides of central tube 27, the central axis of the water outlet tubes as they extend through the head and thence forwardly being parallel to the central axis of tube 27. Tubes 45, 46 thence extend rearwardly of the head within the annular clearance space between barrel 23 and central tube 27 and then converge to have their rearward end portions silver soldered to diametric portion 25 of the water manifold. Each tube 45, 46 opens to a bore 47 in the manifold, one bore 47 being fluidly connected to a bore 50 by an intermediate bore 49, and the other bore 47 being fluidly connected through bore 48 to said bore 50. One end of a water outlet tube 51 is connected to the manifold in fluid communication with bore 50.

Desirably each of the tubes 45, 46 has a front portion 45a, 46b and a rear portion 45b, 46b. Tube portions 45a and 45b, and 46a and 46b are joined together by silver soldered joints. Since portions 45a, 46a are curved, they advantageously are made of copper. However in order to minimize heat transfer, portions 45b, 46b are made of stainless steel.

A water inlet tube 53 has one end connected through line 52a to a source of water under pressure 52 and the opposite end connected to the manifold in fluid communication with bore 54. Bore 54 in turn is placed in fluid communication through an intermediate bore 55 to one bore 57 and through a second intermediate bore 56 to a second bore 57. Each of the bores 57 open through diametric portion 25 to the annular clearance space between barrel 23 and tube 27. As a result when fluid under pressure is pumped through tube 53, the water discharges from bores 57 into the annular clearance space between barrel 23 and tube 27 and then flows axially forwardly in the direction of arrows 58 to pass through the annular clearance space 30 and thence along the inner surfaces of walls 18 to pass through the passageways 36 into chamber 43. Thereafter, the water flows into the inlet ends of tubes 45, 46 respectively and thence through bores 47–50 to the outlet tube 51. Due to the provision of the fluid passages 36 along the side walls 18, the transverse spacing of tube 45, 46 within the water chamber and the space provided between the inner surfaces of walls 18 and adjacent rows of preheat tubes, adequate circulation of fluid takes place to cool walls 18 and the front plate, (including the juncture of the wall 19 with the walls 18) to permit operation of the torch at extremely high temperatures without any hot spots.

A fuse link tube 60 has one end threadedly connected to a boss 61 of the manifold 16, bore 28 having an internally threaded portion for receiving tube 60. The rearward end of the fuse link tube 60 is connected through union 62 to a tube 63, tube 63 in turn being fluidly connected to the mixer body 64 of the mixer assembly 17. The tube 60 spaces the mixer assembly a substantial distance from the water cooled portion of the torch such that if there should be a backflash in the torch, damage will be to the fuse link rather than damaging portions of the torch axially forwardly of said link.

The mixer body 64 has an axially elongated bore, generally designated 67, extended therethrough, tube 63 being threadedly connected in threaded end portion 68 of said bore. Threaded portion 68 opens to a cylindrical mixing chamber portion 69 which in turn opens to the minor base end of the frusto-conical bore portion 70. The major base end of portion 70 opens to cylindrical bore portion 71 which in turn opens to a cylindrical bore portion 72. As may be noted from FIGURES 8 and 9, bore portion 72 is of a larger diameter than bore portion 71 to provide a shoulder 73. Bore portion 72 in turn opens to internally threaded bore portion 73 that form a matching fit with the externally threaded portion of the mixer 74. Mixer 74 has an annular groove for seating an O-ring 75 to form a fluid seal between the mixer body and the mixer in the area of the outer end portion 76 of bore 67 (rearwardly of threaded portion 73).

The mixer body also includes a bore 78 that at one end opens to the outer surface of the mixer body. Bore 78 is of a shape for making a conventional fluid connection 79 between the mixer body and a source of oxygen under pressure, the source of oxygen being designated 80. Conventionally, the connection 79 would include a check valve (not shown) and appropriate control valves (not shown). The inner end of bore 78 opens through a bore 81 to the cylindrical portion 71 of the mixer body main bore 67.

The mixer body also includes a bore 85 of a shape to make conventional fluid connection 86 to a source of appropriate fuel gas 87 that is under pressure. Conventionally the connection 86 also includes an appropriate check valve (not shown) and control valves (not shown), the aforementioned check valves permitting fluid flow from the source of gas toward bores 78, 85 respectively but not in the reverse direction.

The inner end of bore 85 is fluidly connected through bore 86 to the enlarged cylindrical bore portion 72 in an area adjacent thread 73.

The mixer 74 has an enlarged diametric portion 74b that seats against shoulder 73, there being provided an annular groove in portion 74b for an O-ring 80 that forms a fluid seal between the mixer and mixer body. Axially rearwardly of the O-ring 80, the mixer has an annular recess 81 that opens to bore 86. Transverse bores 82 are provided in the mixer to at their one ends open to the annular recess 81 and at their opposite ends open to the adjacent rearward end portion of the axially elongated mixer bore 83. The bore 83 at its opposite end opens to mixing chamber 69 when the mixer is seated against shoulder 73 as shown in FIGURE 8.

Mixer 74 has a reduced diameter portion 74c that at one end is integrally joined to portion 74b and at the opposite end is integrally joined to the major base end of frusto-conical end portion 74d. Portion 74c is of a substantially smaller diameter than the major base diameter of portion 74d whereby there is provided an annular recess in bore portion 71 into which bore 81 opens. Portion 74d is provided with a plurality of circumferentially spaced slots 90 for placing the aforementioned recess in fluid communication with the mixing chamber 69, portion 74d other than for said slots forming a close fit with the adjacent wall defining bore portion 70. As a result, oxygen flows from the source 80 through bores 78, 81 into the annular recess in bore portion 71 and then passes through slots 90 to the mixing chamber 69 to mix with the fuel gas exiting through bore 83 in the mixer.

In using the apparatus of this invention, cold water under pressure is applied through water inlet 53 to pass through the water manifold into the annular space between the gas tube 27 and the barrel 23 (flow in the direction of arrows 58) and thence along the inner surfaces of walls 18 into the water chamber 43 whereby it cools barrel 23 and sidewalls 18 and front wall 19, as well as tubes 39-41. The water thence flows to the transversely spaced inlets of the return tubes 45, 46, through said tubes 45, 46 then through the manifold 16 and thence out through the outlet tube 51. Thus a water flow path is provided to prevent the development of hot spots.

As water is being circulated in the aforementioned manner, appropriate controls in line 79, 86 are operated to apply appropriate ratios of oxygen and fuel gas to be mixed in chamber 69. The mixed gas flows through chamber 69, through tube 63, union 62, fuse link tube 60, manifold bore 28, central tube 27, and thence into the plenum chamber 34. From the plenum chamber gas flows outwardly through tubes 39-41, the gas exiting from tubes 39-41 being ignited whereby it provides a high temperature flame.

In using the mixer with slots 90 and acetylene as the fuel gas, tests indicate no backflashing occurs with oxygen being applied through bore 81 and acetylene through bore 83. However, if oxygen is applied through bore 83 and acetylene through bore 81, backflashing will occur. If hydrogen is used as a fuel gas, backflashing is not stopped due to the provision of slots 90 as set forth above, and accordingly portion 74d may be milled down sufficiently (or otherwise formed) to eliminate slots 90 whereby there is provided an annular clearance between the thus modified mixter and bore portion 70.

As an example of the invention, one embodiment of the type illustrated has a transverse area of substantially four square inches bounded by walls 18, said one embodiment providing flame temperatures up to 6000° F. for a one minute test without burning up or developing gas or water leaks. Recommended maximum flow for said one embodiment with, for example, oxygen and hydrogen are hydrogen 13,000 SCHF, oxygen 6342 SCHF with pressures at torch of 120 p.s.i. for the hydrogen and 160 p.s.i. for the oxygen. Thus the torch of this invention is a high capacity heating torch that can maintain maximum heat output over relatively prolonged periods without breakdown due to the cooling system that provides large volume circulation of continuously moving water in direct contact with every surface exposed to heat.

Frequently when the torch requires repair, it is due to a malfunction of one or more of the preheat tubes. Due to the construction of the torch of this invention, the preheat tubes can be relatively easily replaced. That is the silver solder joint 22 is first melted. However, this does not result in the adapter 24 separating from the barrel 23 as the adapter is brazed at 23a, the joint 22 melting at a much lower temperature than that required to melt brazing 23a. Then the front wall 19 may be heated whereby the silver solder connections to the front ends of the preheat tubes are broken and the housing 18, 19 can be moved from the remainder of the torch. Thereafter, the silver solder connections of the preheat tubes to the preheat plate 32 are melted, the walls 33 remaining joined to the torch head due to the much higher melting point brazing 38. The preheat tubes are removed and the preheat tube apertures in the preheat plate are reamed, if necessary. Now the necessary or all of the preheat tubes are replaced and silver soldered to the preheat plate, the housing silver soldered to the preheat tubes, and the housing silver soldered to the adapter to form joint 22. Advantageously members 18, 19, 21, 23, 27, 29, 32, 33 and 39-41 are made of copper.

What I claim is:

1. In liquid cooled heating torch apparatus, a torch head, a preheat member having a plate, said head and preheat member cooperatively forming a plenum chamber, an axially elongated first tube having one end portion opening to the plenum chamber, first means for joining said preheat member and torch head in fluid tight relationship, a plurality of transversely spaced preheat tubes each having one end opening to said plenum chamber, extending away from said plate and an opposite outlet end opening to the ambient atmosphere, second means for joining said preheat tubes to said plate in fluid tight relationship, a housing in surrounding relationship to said preheat tubes, preheat member and at least in part overlapping said torch head, said housing and preheat member cooperatively forming a liquid chamber surrounding a major portion of said preheat tubes, and passageways around the periphery of the preheat member that open to said liquid chamber, said housing being spaced from the torch head to provide a perimetric clearance space surrounding at least one end portion of said torch head and opening to said passageways to permit liquid flow between said clearance space and liquid chamber, said housing having an open end adjacent said torch head and a wall opposite said open end, said preheat tubes outlet ends opening through said wall, a barrel surrounding said elongated tube having a first end portion, means for attaching said barrel first end portion to the open end portion of the housing to form a fluid seal between the barrel and housing and retain said barrel first end portion spaced from the torch head and generally concentric to said first tube in spaced relationship thereto to provide a liquid passageway between said barrel and first tube that opens to said clearance space and conduit means extending within the barrel and opening to said liquid chamber for conducting liquid.

2. The apparatus of claim 1 further characterized in that said torch head has an annular portion extended into said barrel in spaced relationship to said barrel to provide said clearance space and an opposite end portion more closely adjacent said housing wall, and that said preheat member includes a wall surrounding at least an axial portion of said head opposite end portion, said preheat member wall having perimetrically spaced lands abutting against said housing to provide at least a portion of the first mentioned passageway and additional liquid passageways around the periphery of said preheat member.

3. Liquid cooled heating torch apparatus comprising an elongated tube having opposite end portions for conducting a combustible gas mixture, first means connected to one end portion of said elongated tube for forming a plenum chamber in fluid communication with the interior of said elongated tube, a plurality of transversely spaced preheat tubes connected to said first means to extend away from said first means in a direction generally opposite said elongated tube, each preheat tube having one end portion opening to the plenum chamber and an opposite end portion providing an outlet at which the gas flowing therethrough is ignited, means enclosing said preheat tubes other than said outlets for forming a water chamber surrounding said tubes, said enclosure means comprising a housing that includes a front wall having the preheat tube outlets opening therethrough and side walls joined to said front wall to extend rearwardly thereof, said first means including a plate mounting said preheat tubes one end portions in transverse spaced relationship to have said preheat tubes open to the plenum chamber, a torch head connected to said plate to in conjunction therewith form said plenum chamber, said torch head being connected to said elongated tube, said side walls extending in axial overlapped relation to at least a portion of said torch head and spaced therefrom to provide a liquid passageway opening to said water chamber, means for supplying water under pressure to said water chamber, means opening to said water chamber for returning liquid that has passed into said water chamber, the aforementioned water supply means including an elongated barrel in surrounding relationship to said elongated tube to provide a clearance space, means for connectingly forming a fluid seal between one end of said barrel and the side wall rear portions and permitting liquid flow from the barrel through said passageway to adjacent said side walls, a manifold having a bore opening to said elongated tube and connected to the one end of said barrel, said manifold having a liquid passageway opening into the barrel exterior of said elongated tube, and means for supplying liquid to the manifold to pass through the last mentioned liquid passageway to said clearance space, said manifold including a third liquid passageway opening to said clearance space between said barrel and said elongated tube, said third liquid passageway forming a part of said return means, said return means also including means connected to said manifold for conducting liquid flowing through said third passageway away from said manifold, and a return tube having an outlet portion connected to said manifold in fluid communication with said third passageway, an intermediate portion extending through said barrel exterior of said elongated tube and thence through said plenum chamber means, and an inlet portion opening to said water chamber, and means for supplying a combustible gas mixture to the opposite end portion of said elongated tube, said combustible gas supply means including a fuse link tube having a one end portion connected through said manifold in fluid communication with said elongated tube and an opposite end portion, a mixer assembly having a main bore, and oxygen inlet and a fuel gas inlet, and means for connecting the fuse link tube opposite end portion to the mixer assembly in fluid communication with said main bore, said mixer assembly including a mixer body having said main bore, oxygen inlet and fuel gas inlet, said main bore including an outlet portion, a shoulder portion, a reduced diameter portion intermediate said shoulder portion and outlet portion and a frusto conical portion intermediate the above mentioned reduced diameter portion and outlet portion, and a mixer seatable in said main bore, said mixer having a diametric portion seatable against said shoulder portion, a reduced diameter portion to in conjunction with said bore reduced diameter portion provide an annular clearance space, and a frusto conical portion to form a close fit with the bore frusto conical portion, said mixer frusto conical portion having circumferential spaced slots for placing the last mentioned annular clearance space in fluid communication with the bore outlet portion, said oxygen inlet opening to said last mentioned clearance space, said mixer having an annular groove axially opposite the shoulder portion from said last mentioned clearance space, and a fluid passageway opening to said annular groove and to the bore outlet portion radially intermediate said slots, said fuel gas inlet opening to said annular groove, means for supplying a fuel gas under pressure to said fuel gas inlet, and means for supplying oxygen under pressure to said oxygen inlet.

4. The apparatus of claim 3 further characterized in that said fuel gas supply means comprises a source of pressurized acetylene.

5. In liquid cooled heating torch apparatus, a torch head, a preheat member having a plate, said head and preheat member cooperatively forming a plenum chamber, an axially elongated first tube having one end portion opening to the plenum chamber, first means for joining said preheat member and torch head in fluid tight relationship, a plurality of transversely spaced preheat tubes each having one end opening to said plenum chamber, extending away from said plate and an opposite outlet end opening to the ambient atmosphere, second means for joining said preheat tubes to said plate in fluid tight relationship, a housing in surrounding relationship to said preheat tubes, preheat member and at least in part overlapping said torch head, said housing and preheat member cooperatively forming a liquid chamber surrounding a major portion of said preheat tubes, a clearance space surrounding at least a portion of said torch head and a passageway to permit liquid flow between said clearance space and liquid chamber, said housing having an open end adjacent said torch head and a wall opposite said open end, said preheat tubes outlet ends opening through said wall, a barrel surrounding said elongated tube and having a first end portion, means for attaching said barrel first end portion to the open end portion of the housing to form a fluid seal between the barrel and housing and retain said barrel first end portion generally concentric to said first tube in spaced relationship thereto to provide a liquid passageway between said barrel and first tube that opens to said clearance space, said means for attaching said barrel to said housing including an adaptor having the barrel extended therethrough, third means for joining said housing to said adaptor in fluid tight relationship, and fourth means for joining said adaptor to said barrel in fluid tight relationship, and conduit means extending within the barrel and opening to said liquid chamber for conducting liquid.

6. The apparatus of claim 5 further characterized in that said first means comprises a brazed joint, that said second and third means comprise silver solder joints and that said fourth means includes brazed junctures between said barrel and adaptor.

7. The apparatus of claim 6 further characterized in that said fourth means includes an exterior silver solder joint between said adaptor and barrel and that said brazed junctures joined the adjacent edge of said barrel to said adaptor.

8. In liquid cooled heating torch apparatus, a torch head, a preheat member having a plate, said head and preheat member cooperatively forming a plenum chamber, an axially elongated first tube having one end portion opening to the plenum chamber, first means for joining said preheat member and torch head in fluid tight relationship, a plurality of transversely spaced preheat tubes each having one end opening to said plenum chamber, extending away from said plate and an opposite outlet end opening to the ambient atmosphere, second means for joining said preheat tubes to said plate in fluid tight relationship, a housing in surrounding relationship to said preheat tubes, preheat member and at least in part overlapping said torch head, said housing and preheat member cooperatively forming a liquid chamber surrounding a major portion of said preheat tubes, a clearance space surrounding at least a portion of said torch head and a passageway to permit liquid flow between said clearance space and liquid chamber, said housing having an open end adjacent said torch head and a wall opposite said open end, said preheat tubes outlet ends opening through said wall, a barrel surrounding said elongated tube and having a first end portion, said torch head having an annular portion extended into said barrel in spaced relationship to said barrel to provide said clearance space and an opposite end portion more closely adjacent said housing wall, and said preheat member including a wall surrounding at least an axial portion of said head opposite end portion, said preheat member wall having perimetrically spaced lands abutting against said housing to provide at least a portion of the first mentioned passageway and additional liquid passageways around the periphery of said preheat member, means for attaching said barrel first end portion to the open end portion of the housing to form a fluid seal between the barrel and housing and retain said barrel first end portion generally concentric to said first tube in spaced relationship thereto to provide a liquid passageway between said barrel and first tube that opens to said clearance space and conduit means extending within the barrel and opening to said liquid chamber for conducting liquid.

9. The apparatus of claim 8 further characterized in that some of the preheat tubes have smaller inside diameters than other preheat tubes, the preheat tubes being transversely arranged to have the smaller diameter ones surrounded by the larger diameter ones.

10. The apparatus of claim 8 further characterized in that said conduit means comprises two liquid return tubes each having an intermediate portion and each having an inlet opening to said liquid chamber substantially spaced from said housing wall and preheat member, the inlets being substantially transversely spaced from one another and the intermediate portions extending through said preheat member and torch head in fluid sealed relationship thereto.

11. The apparatus of claim 10 further characterized in that said housing has side walls joined to the aforementioned housing wall and surrounding at least an axial portion of said torch head, said preheat tubes being substantially spaced from said side walls, and there being preheat tubes transversely located between the return tube inlets and between each housing side wall and return tube inlet.

12. In liquid cooled heating torch apparatus, a torch head, a preheat member having a plate, said head and preheat member cooperatively forming a plenum chamber, an axially elongated first tube having one end portion opening through the torch head to the plenum chamber, first means for joining said preheat member and torch head in fluid tight relationship, a plurality of transversely spaced preheat tubes each having one end opening to said plenum chamber, extending away from said plate and an opposite outlet end opening to the ambient atmosphere, second means for joining said preheat tubes to said plate in fluid tight relationship, a housing in surrounding relationship to said preheat tubes and preheat member, said housing and preheat member cooperatively forming a liquid chamber surrounding a major portion of said preheat tubes, and passageways surrounding the periphery of the preheat member to permit liquid flow to said liquid chamber, said housing having an open end adjacent said torch head and a wall opposite said open end, said preheat tubes outlet ends opening through said wall, a barrel surrounding said elongated tube and having a first end portion, means for attaching said barrel first end portion to the open end portion of the housing to form a fluid seal between the barrel and housing and retain said barrel one end portion generally concentric to said first tube in spaced relationship thereto to provide a liquid passageway between said barrel and first tube, said barrel, the last mentioned means and the torch head cooperatively forming a clearance space surrounding at least one end portion of the torch head for conducting liquid from said liquid passageway to said passageways, means opening into the barrel remote from the housing to supply a cooling liquid to the liquid passageway, and conduit means extending within the barrel and opening to said liquid chamber for conducting liquid away from said liquid chamber.

13. Torch apparatus comprising a mixer assembly, said mixer assembly including a mixer body having an axially elongated main bore, an oxygen inlet and a fuel gas inlet, said main bore including an outlet portion, a shoulder portion, a reduced diameter portion intermediate said shoulder portion and outlet portion, and a frusto-conical portion intermediate the above mentioned reduced diameter portion and outlet portion, and a mixer seatable in said main bore, said mixer having a diametric portion seatable against said shoulder portion, a reduced diameter portion to in conjunction with said bore reduced diameter portion provide an annular clearance space, and a frusto-conical portion to form a close fit with the bore frusto-conical portion, said mixer frusto-conical portion having circumferential spaced slots for placing the annular clearance space in fluid communication with the bore outlet portion, said oxygen inlet opening to said clearance space, said mixer having an annular groove axially opposite the shoulder portion from said last mentioned clearance space, and a fluid passageway opening to said annular groove and to the bore outlet portion radially intermediate said slots, said fuel gas inlet opening to said annular groove, means for supplying a fuel gas under pressure to said fuel gas inlet, means for supplying oxygen under pressure to said oxygen inlet, a torch head assembly having a gas inlet and an outlet opening to the ambient atmosphere, and means connecting the mixer assembly to the torch head assembly for conducting gas from the main bore outlet portion to the torch head assembly inlet.

14. Torch apparatus comprising a mixer body having an axially elongated main bore, said main bore having a threaded portion, a first cylindrical portion having one end opening to said threaded portion, a reduced diameter portion to opening at one end to the other end of the above cylindrical portion to provide a shoulder, a frusto-conical portion having a major base opening to the other end of the above reduced diameter portion, and a mixing chamber opening to the minor base opening of the above frusto-conical portion, a mixer within said main bore, said mixer including a threaded portion to form a threading fit in the bore threaded portion, a first diametric portion joined to the mixer threaded portion and having an annular surface portion seatable against said shoulder, a reduced diameter portion joined to said first diametric portion and extending in said bore reduced diameter portion to provide an annular clearance space, and frusto-conical means joined to the mixer reduced diameter portion for placing the mixing chamber in fluid communication with the annular clearance space, said first diametric portion having an annular groove, said mixer having a fluid passageway opening to said annular groove and through the frusto-conical means to the mixing chamber, said mixer body having a first gas inlet opening to the main bore at the annular groove, and a second gas inlet opening to said annular clearance space, means for applying a fuel gas under pressure to one of the gas inlets, means for applying oxygen under pressure to the other gas inlet, a torch head assembly and means connecting the mixer assembly to the torch head assembly for conducting gas from the mixing chamber to the torch head assembly.

15. The appaaratus of claim 14 further characterized in that said frusto-conical means include angularly spaced vane portions, each of which forms a close fit with the mixer body wall portion defining said frusto-conical bore portion.

16. The apparatus of claim 15 further characterized in that means for applying fuel gas includes a source of acetylene and is fluidly connected to the first gas inlet.

References Cited

UNITED STATES PATENTS

| | | | |
|---|---|---|---|
| 1,389,301 | 8/1921 | Gilbert et al. | 158—27.4 |
| 2,129,681 | 9/1938 | Géibig | 239—132.3 |
| 2,191,077 | 2/1940 | Kehl | 158—27.41 |
| 2,561,038 | 7/1951 | Symons | 239—132.3 |
| 3,232,538 | 2/1966 | Hammon | 239—132.3 |

FOREIGN PATENTS

| | | |
|---|---|---|
| 1,240,701 | 8/1960 | France. |
| 12,519 | of 1887 | Great Britain. |
| 314,721 | 7/1929 | Great Britain. |
| 491,624 | 7/1929 | Great Britain. |

M. HENSON WOOD, JR., *Primary Examiner.*

V. C. WILKS, *Assistant Examiner.*

UNITED STATES PATENT OFFICE
CERTIFICATE OF CORRECTION

Patent No. 3,358,929                            December 19, 1967

Joseph F. Fleischhacker

It is hereby certified that error appears in the above numbered patent requiring correction and that the said Letters Patent should read as corrected below.

Column 5, line 68, for "mixter" read -- mixer --; column 6, line 1, for "13,000" read -- 13,100 --.

Signed and sealed this 11th day of February 1969.

(SEAL)
Attest:

Edward M. Fletcher, Jr.                              EDWARD J. BRENNER
Attesting Officer                                           Commissioner of Patents